United States Patent
Werner et al.

(10) Patent No.: US 7,127,636 B2
(45) Date of Patent: Oct. 24, 2006

(54) AUTONOMIC RECOVERY OF PPRC ERRORS DETECTED BY PPRC PEER

(75) Inventors: Sam C. Werner, Tucson, AZ (US); Paul M. Richards, Tucson, AZ (US); Warren K. Stanley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/658,054

(22) Filed: Sep. 8, 2003

(65) Prior Publication Data

US 2005/0055602 A1     Mar. 10, 2005

(51) Int. Cl.
  *G06F 11/00*   (2006.01)
(52) U.S. Cl. ......................................... 714/6
(58) Field of Classification Search .................. 714/6
See application file for complete search history.

(56) References Cited

U.S. PATENT DOCUMENTS

| | | | |
|---|---|---|---|
| 5,446,871 A | | 8/1995 | Shomler et al. |
| 5,504,861 A | | 4/1996 | Crockett et al. |
| 5,615,329 A | * | 3/1997 | Kern et al. ................... 714/6 |
| 5,870,537 A | | 2/1999 | Kern et al. |
| 5,928,367 A | * | 7/1999 | Nelson et al. ................ 714/6 |
| 6,173,377 B1 | * | 1/2001 | Yanai et al. ................ 711/162 |
| 6,260,124 B1 | | 7/2001 | Crockett et al. |
| 6,308,283 B1 | * | 10/2001 | Galipeau et al. ............... 714/6 |
| 6,347,335 B1 | * | 2/2002 | Shagam et al. ............ 709/223 |
| 6,430,577 B1 | | 8/2002 | Hart |
| 6,463,501 B1 | * | 10/2002 | Kern et al. .................. 711/100 |
| 6,842,834 B1 | * | 1/2005 | Crockett et al. ............ 711/162 |
| 2001/0010070 A1 | | 7/2001 | Crockett et al. |
| 2004/0034808 A1 | * | 2/2004 | Day et al. ...................... 714/6 |
| 2004/0260970 A1 | * | 12/2004 | Beardsley et al. ............. 714/6 |

* cited by examiner

*Primary Examiner*—Scott Baderman
*Assistant Examiner*—Brian Assessor
(74) *Attorney, Agent, or Firm*—Dan Shifrin

(57) ABSTRACT

A method for initiating a data storage facility recovery process in a data processing system having a first peer data storage facility and a second peer data storage facility communicating with the first peer data storage facility by a communication link. The method of initiating a recovery process is invoked by one peer data storage facility upon another peer data storage facility operating under a peer to peer remote copy (PPRC) protocol. Data copied from a first peer data storage facility to a second peer data storage facility is monitored for errors. Upon detection of an error by one peer data storage facility, recovery and data collection operations are initiated on the other peer data storage facility. Preferably, the initiation of recovery and data collection operations occurs out of band, over a second communication link between the peer data storage facilities.

7 Claims, 2 Drawing Sheets

AUTONOMIC RECOVERY OF PPRC ERRORS DETECTED BY PPRC PEER

TECHNICAL FIELD

The present invention relates generally to the field of data storage systems having multiple storage facilities. In particular, the present invention relates to the initiation of an error recovery process on a first peer data storage facility when a data error is detected by a second peer data storage facility where data between the storage facilities is synchronized by a peer-to-peer remote copy (PPRC) protocol.

BACKGROUND ART

Businesses employing large scale data processing systems must maintain hardware and software to assure that critical business data is not lost in the event of a disaster. Disasters can range from catastrophic events such as fire, terrorist attack or flood to relatively minor occurrences such as local power outages. A commonly used method of assuring that no critical business data is lost in the event of a disaster consists of maintaining separate high reliability disk based data storage facilities at separate locations. Often the separate data storage facilities are located miles away from each other to assure that both of the multiple data storage facilities are not compromised by a common disaster.

When multiple storage facilities are employed, it is necessary to synchronize the data between the facilities. One protocol for synchronizing the data between separate storage facilities is peer-to-peer remote copy (PPRC). PPRC is a hardware based disaster recovery and workload migration solution that maintains a synchronous copy (always up to date with the primary copy) of data at the remote location. The backup copy of data can be used to quickly recover from a failure in the primary system without losing any transactions. Typically, a host computer such as an IBM® System/390® communicates to a first storage facility such as an IBM Enterprise Storage Server® (ESS). The first storage facility is typically designated as the primary storage facility. Communication between the host computer and the primary storage facility typically occurs over a dedicated data link such as an optical ESCON® (Enterprise System Connection Architecture®) link. A second data storage facility completes the fundamental PPRC based data storage system. The second data storage facility is typically designated the secondary data storage facility and is connected to the primary data storage facility via a communication link similar to that connecting the host computer to the primary. The PPRC protocol maintains a synchronous copy on the secondary of all data stored to the primary by the host computer. To achieve additional safety and reliability, multiple storage facilities can be cascaded in a manner similar to the implementation of a primary and secondary storage facility.

Storage facilities such as the IBM ESS are inherently reliable and self-healing. These facilities are capable of detecting and correcting a range of both software and hardware errors. Various recovery processes are known in the art. The process used on the IBM ESS to perform a recovery is referred to as a "warmstart". Warmstart is an accelerated method of accomplishing a system reboot. Typically, warmstart does not involve every re-initialization step of a full reboot. Warmstarts are typically initiated by simple debug commands, or initiated by a server upon itself when the server detects an internal error. In the case of the IBM ESS, a device specific control function such as the IOCTL (warmstart) command is used to initiate the warmstart. In addition to performing a system recovery, prior to or upon execution of a warmstart command a data storage facility will typically save the state of the data storage facility and a continuous event log buffer to disk. This information can later be reviewed by a system developer to facilitate root cause problem analysis.

One of the problems historically experienced with a data storage system implemented with PPRC protocols is that a first peer may occasionally send erroneous or incorrect data to the second peer. The problem can arise either when the primary sends erroneous data to the secondary or, conversely, when the secondary sends an erroneous response back to the primary. In the event of the primary sending erroneous data to the secondary, the secondary may detect an error with the data and commence a warmstart recovery process upon itself along with storage of root cause data. Unfortunately the problem is actually occurring on the primary or the data link, and therefore initiation of a recovery process on the secondary does not address the problem, and no useful data is collected. In cases where the error is caused by a hardware or software problem associated with either a single peer storage system or the data link between the peers, and the problem is recognized by the other peer, there is no mechanism known in the art to invoke a warmstart and cause data collection on the peer causing the error. In summary, the problem may only exist on the primary, but the secondary is the storage facility able to detect the error. Conversely, the primary can be the only peer able to detect an error on the secondary. For example: the primary may attempt to send an "update write" command to the secondary, but the format of the data track is different on the secondary (relative to the primary). It could be of a different record length, for example. In such a case, it would be highly desirable to invoke the warmstart process on both the primary and the secondary and to collect root cause data from both storage facilities. Or, the primary may receive an unexpected response from the secondary, for example an unexpected unit check. In such a case, it is desirable to have the primary force a warmstart with data collection upon the secondary.

In addition, it is possible that the communication link between the primary and secondary storage facilities may be the cause of the data error. Therefore, it is desirable to use an out-of-band communication path to invoke the error recovery and data collection operations on the peers.

The present invention is directed to overcoming one or more of the problems discussed above.

SUMMARY OF THE INVENTION

The need in the art is addressed by a method for initiating a data storage facility recovery process in a data processing system. The system has a first peer data storage facility and a second peer data storage facility communicating with the first peer data storage facility by a communication link. The method of initiating a recovery process is invoked by executing a first write operation to store data from a host computer to the first peer data storage facility. A second write operation is then used to copy the stored data over the communication link from the first peer data storage facility to the second peer data storage facility. The data associated with the second write operation is monitored at the second peer data storage facility to determine if the data contains an error. In the event the data contains an error, the first peer data storage facility is instructed to initiate a first error recovery operation on the first peer data storage facility.

Preferably, the instruction of the first peer data storage facility to initiate a first error recovery operation is accomplished over a second communication link separate from the first communication link. The first error recovery operation may consist of issuing a device specific control function to the first peer data storage facility causing a warmstart. The monitoring undertaken at the second peer data storage facility may consist of defining a trigger event and analyzing a running text log buffer associated with the second write operation to detect the trigger event. Preferably, the trigger event comprises a predetermined data string or strings. In addition to initiating first error recovery operations, detection of an error may also direct the first peer storage facility to store a first root cause data set. The first root cause data set may consist of a record of the state of the first peer data storage facility at the time of determination of the error and a continuous event log buffer. Contemporaneously with the initiation of the first error recovery operation, detection of an error may also initiate a second error recovery operation on the second peer data storage facility.

One feature of the invention is its symmetrical operation. Preferably, the second peer data storage facility communicates a response to the first peer data storage facility upon receipt of the data associated with the second write operation. Monitoring undertaken at the first peer data storage facility can determine whether the response indicates a problem with the second write operation. In the event a problem is detected, the second peer data storage facility can be instructed to initiate a second error recovery operation on the second peer data storage facility.

Another embodiment of the invention is a data storage system coupled to a host computer. The system has a first peer data storage facility and a second peer data storage facility communicating with the first peer data storage facility by a communication link. In addition, the data storage system has means for storing data from the host computer to the first peer data storage facility and means for executing a second write operation to copy the stored data over the communication link from the first peer data storage facility to the second peer data storage facility. In addition, the data storage system has monitoring apparatus associated with the second peer data storage facility to determine if the data associated with the second write operation contains an error. If an error is detected, instructing means instruct the first peer data storage facility to initiate a first error recovery operation on the first peer data storage facility.

A further embodiment of the invention is an article of manufacture for use in programming a data storage system to initiate a data recovery process. The article of manufacture comprises a storage medium having logic embedded therein to cause the components of the data storage system to execute a first write operation to store data from a host computer to the first peer data storage facility. Subsequently, the logic embedded in the article of manufacture causes the data storage system to execute a second write operation to copy the stored data over the communication link from the first peer data storage facility to the second peer data storage facility. In association with the second write operation, the logic embedded within the article of manufacture causes the monitoring of the data associated with the second write operation to determine if the data contains an error. If an error is detected, the embedded logic instructs the first peer data storage facility to initiate a first error recovery operation.

DETAILED DESCRIPTION OF THE PREFERRED EMBODIMENT

Figure 1:
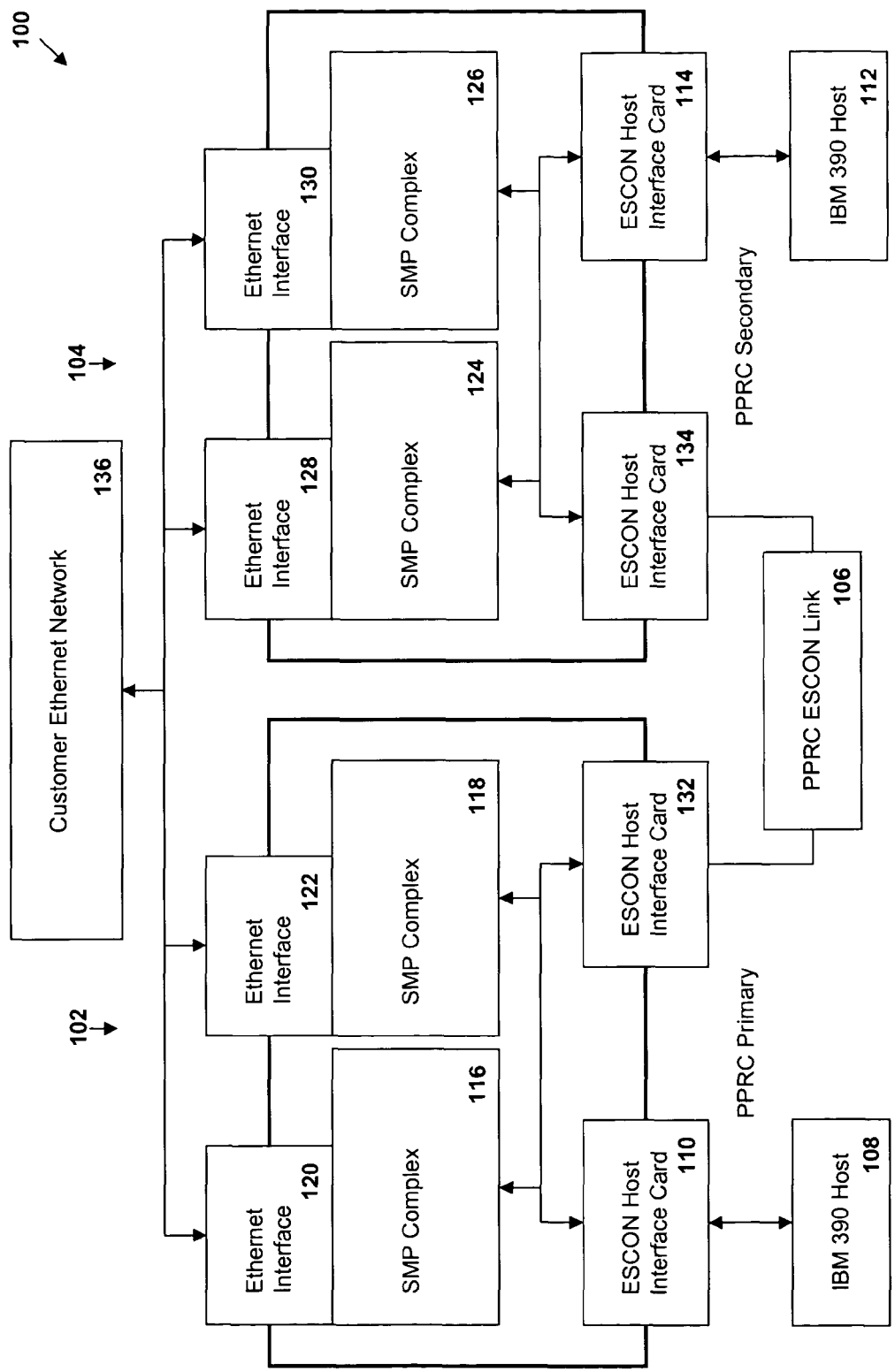
FIG. 1 is a block diagram of a data storage facility in which the present invention may be implemented.

FIG. 1 is a block diagram of a data storage system 100 in which the present invention may be implemented. The data storage system 100 consists of at least a first peer data storage facility 102 and a second peer data storage facility 104. The storage facilities are connected to each other via a dedicated communication link 106.

It is customary in practice to designate the first peer data storage facility 102 (the facility to which data is first written) as the "primary data storage facility". It is important to note that in a symmetrical PPRC system, the designations of primary and secondary storage facilities are arbitrary and interchangeable. The features of the invention disclosed herein can operate in either direction between a primary and a secondary data storage facility and are applicable to cascaded systems where the PPRC protocol causes the contemporaneous storage of data to multiple storage facilities. The storage facility to which data is copied is customarily designated as the "secondary". The first peer data storage facility 102 and second peer data storage facility 104 are configured for the synchronized storage of data using a peer-to-peer remote copy (PPRC) protocol.

The first peer data storage facility 102 is connected to a host computer 108 via a host interface card 110. Similarly, the second peer storage facility 104 may be connected to a host computer 112 via a host interface card 114. The first peer data storage facility 102 typically has two symmetric multiprocessor complexes 116, 118. The sub-components of the symmetric multiprocessor complexes 116, 118 which are relevant to this invention are the Ethernet interfaces 120, 122. The second peer data storage facility also has symmetric multiprocessor complexes 124, 126 along with associated Ethernet interfaces 128, 130.

The dedicated communication link 106 connects the first peer data storage facility 102 to the second peer data storage facility 104 through interface cards 132, 134. The communication link 106 is the pathway over which synchronous data copying occurs and the PPRC protocol is implemented. In addition to the communication link 106, the first peer data storage facility 102 is preferably connected to the second peer data storage facility 104 through an out-of-band pathway, typically an Ethernet network 136. The Ethernet network 136 is connected to each storage facility 102, 104 through the Ethernet interfaces 120, 122, 128, 130.

The first peer data storage facility 102 and the second peer data storage facility 104 may be installed in separate locations miles away from each other to insulate the system from destruction in a common disaster. The PPRC protocol is implemented by the host computer 108 writing data to the first peer data storage facility 102 in a first write operation. The PPRC system causes the first peer data storage facility 102 to copy the data in a second write operation to the second peer data storage facility 104. This second write operation occurs over the communication link 106. The designation of one storage facility as the first peer data storage facility and the other storage facility as the second peer data storage facility is arbitrary and in operation the designations can be reversed as deemed necessary.

The first peer data storage facility and second peer data storage facilities 102, 104 are designed to be reliable and self-healing. Each is typically capable of detecting and correcting a range of both software and hardware errors. The process used to perform a recovery from an error is referred to as a "warmstart".

One of the problems historically experienced when synchronizing data under a PPRC protocol is that one of the peers, such as the first peer data storage facility 102 will send data to the other peer, in this case the second peer data storage facility 104 which will detect an error with the data and subsequently go into a self-initiated warmstart recovery process. The error may exist only on the first peer data storage facility 102, but the second peer data storage facility 104 can be the only facility able to detect the error. An example of such an error case is the first peer data storage facility 102 attempting to send an "update write" command to the second peer data storage facility 104, but the format of the data track is different on the second peer data storage facility 104 (relative to the first peer data storage facility 102). This error might be caused by a different record length, for example. In this case, the present invention causes the warmstart process to initiate on the first peer data storage facility 102 and preferably on the second peer data storage facility 104.

Figure 2:
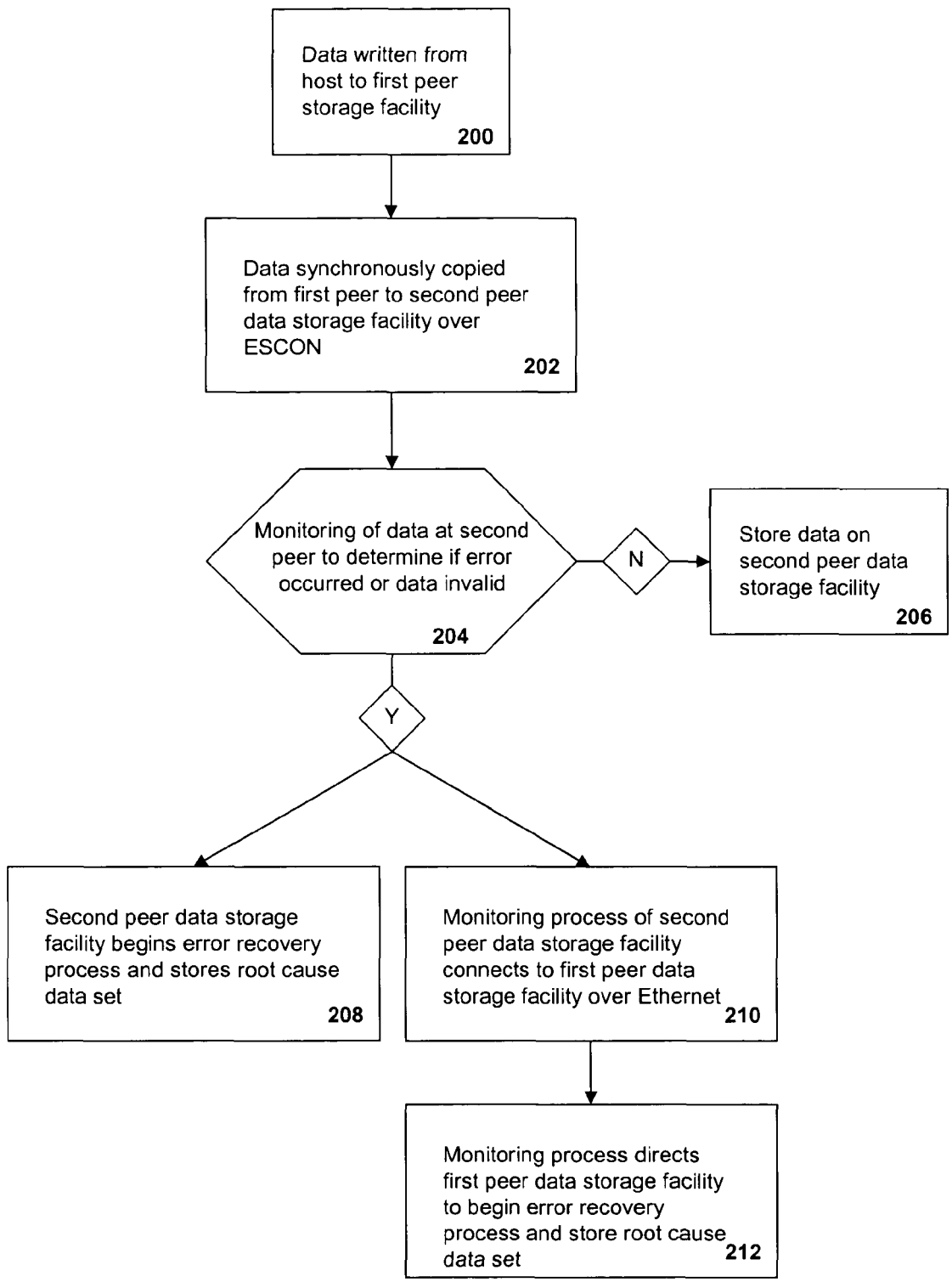
FIG. 2 is a flowchart of the method of the present invention.

FIG. 2 is a flowchart of a method of the present invention. Under normal operation, data is written from the host computer 108 to the first peer data storage facility 102 (step 200). When operating under a PPRC or similar protocol, data is also synchronously copied from the first peer data storage facility 102 to the second peer data storage facility 104 over the communication link 106 (step 202). As the second write operation occurs, the second peer data storage facility 104 is monitoring the data to determine whether an error has occurred or if the data is invalid (step 204). If no error is determined to have occurred, the data is stored on the second peer data storage facility (step 206).

Specifically, the mechanism for detecting the error in the data of the second write command to the second peer data storage facility 104 can be analysis of a running text log buffer. Certain strings can be defined as trigger events which will cause a monitoring program to determine if an error has occurred. In the event an error is detected, two processes will be initiated, preferably simultaneously. First, the second peer data storage facility 104 will begin self-initiated error recovery processes on the second peer data storage facility 104 and store a second root cause data set (step 208). In addition, the monitoring program of the second peer data storage facility 104 will connect to the first peer data storage facility 102 (step 210) and direct the first peer data storage facility 102 to begin a first error recovery operation and store a first root cause data set (step 212).

In the event an error is detected, it is often not possible to determine immediately the source or location of the error. It is possible that the error occurs because of a failure in the communication link 106 between the first peer data storage facility 102 and the second peer data storage facility 104. Therefore, it is desirable to use an out-of-band communication path to initiate the error recovery operation (step 212). Ideally, the customer Ethernet network 136 which is connected for control purposes to the first peer data storage facility 102 and second peer data storage facility 102, 104 through each storage facility's Ethernet interfaces 120, 122, 128, 130 can be used to initiate error recovery. The PPRC recovery and data collection processes described above are fully symmetrical meaning recovery and data collection operations can be initiated both on the first peer data storage facility 102 in response to errors detected by the second peer data storage facility 104, and recovery and data collection operations can be initiated on the second peer data storage facility 104 in response to errors detected by the first peer data storage facility 102. The concepts disclosed above are equally applicable to cascaded systems featuring more than two peer storage facilities.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for initiating a data storage facility recovery process in a data processing system having a first peer data storage facility and a second peer data storage facility communicating with the first peer data storage facility by a first communication link, the method comprising:
   executing a first write operation to store data from a host computer to the first peer data storage facility;
   executing a second write operation to copy the stored data over the first communication link from the first peer data storage facility to the second peer data storage facility;
   monitoring the data associated with the second write operation to determine if the data contains an error, comprising:
      defining a trigger event comprising a predetermined data string; and
      analyzing a running text log buffer associated with the second write operation to detect the trigger event; and
   instructing the first peer data storage facility to initiate a first error recovery operation on the first peer data storage facility upon detection of the error.

2. The method of claim 1, wherein instructing the first peer data storage facility to initiate the first error recovery operation comprises instructing the first peer data storage facility by communication over a second communication link, separate from the first communication link.

3. The method of claim 1 wherein the first error recovery operation comprises issuing a device specific control function causing a warmstart on the first peer data storage facility.

4. The method of claim 1 further comprising directing the first peer data storage facility to store a first root cause data set upon instruction to initiate the first error recovery operation.

5. The method of claim 4 wherein the first root cause data set comprises:
   a record of the state of the first peer data storage facility at the time of determination of the error; and
   a continuous event log buffer.

6. The method of claim 1 further comprising instructing the second peer data storage facility to initiate a second error recovery operation on the second peer data storage facility upon detection of the error.

7. The method of claim 1 further comprising:
   instructing the second peer data storage facility to respond to the first peer data storage facility in association with the second write operation;
   monitoring the response to detect if the response indicates a problem with the second write operation; and
   instructing the second peer data storage facility to initiate a second error recovery operation on the second peer data storage facility upon detection of the problem with the second write operation.

* * * * *